| United States Patent [19] | [11] Patent Number: 4,683,067 |
|---|---|
| Aleman et al. | [45] Date of Patent: Jul. 28, 1987 |

[54] METHOD AND APPARATUS FOR CLEANING TOWER BASINS

[76] Inventors: Javier Aleman, 1146 Fourth St., Stone Mountain, Ga. 30083; Kevin B. McBurney, 1470 Ashbrook Dr., Lawrenceville, Ga. 30245

[21] Appl. No.: 771,276

[22] Filed: Aug. 30, 1985

[51] Int. Cl.⁴ ............ B01D 35/16; B01D 35/28; B01D 36/04
[52] U.S. Cl. ............ 210/767; 210/167; 210/241; 210/316; 210/411; 210/416.1; 15/1.7
[58] Field of Search ............ 210/416.1, 416.2, 241, 210/411, 322, 791, 798, 525, 806, 767, 169, 167, 316; 15/1.7; 137/140, 123, 130, 125, 141; 261/DIG. 11; 134/21, 22.1

[56] References Cited

U.S. PATENT DOCUMENTS

| 1,530,845 | 3/1925 | Milkey | 210/416.1 |
|---|---|---|---|
| 1,661,699 | 3/1928 | Magnin | 137/142 |
| 3,245,420 | 4/1966 | Cherney | 15/1.7 |
| 3,528,551 | 9/1970 | Herubel | 210/416.1 |
| 3,734,853 | 5/1973 | Horvath | 15/1.7 |
| 4,213,479 | 7/1980 | Pearson | 210/241 |
| 4,240,173 | 12/1980 | Sherrill | 15/1.7 |
| 4,362,628 | 12/1982 | Kennedy et al. | 210/712 |
| 4,374,024 | 2/1983 | Peloquin et al. | 210/241 |
| 4,377,475 | 3/1983 | Wiedemann | 210/416.1 |
| 4,389,351 | 6/1983 | O'Brien | 210/534 |
| 4,427,553 | 1/1984 | Fore | 210/743 |

FOREIGN PATENT DOCUMENTS

| 572545 | 6/1924 | France | 210/169 |
|---|---|---|---|
| 1601110 | 9/1970 | France | 210/169 |

OTHER PUBLICATIONS

"Cooling Tower Fundamentals", 2nd edition, The Marley Cooling Tower Company, Mission, Kansas (Kansas City, Mo.) 66202, 1985.
Ellison, "Cleaning Cooling Tower Basins", French, Ltd., Jan. 1967 (Cooling Tower Institute, Houston, Texas).
Bulletin M241/1-0, "B.A.C. Series 3000 Industrial Cooling Towers", Baltimore Aircoil Company, Inc., 1985.
Shortley and Williams, *Elements of Physics*, Prentice-Hall, Inc., New York, 1953, p. 210.

Primary Examiner—Richard V. Fisher
Assistant Examiner—Linda S. Evans
Attorney, Agent, or Firm—James B. Middleton

[57] ABSTRACT

A method and apparatus for cleaning cooling tower basins. The apparatus includes a reservoir and large pipe extending from the tower basin to a lower level to act as a siphon. A water supply can fill the large pipe, and a valve can be opened to start the siphon. A cleaning tool remains below the water level in the basin to maintain the siphon while the basin is cleaned. The makeup water valve maintains the desired water level in the basin, so the tower can remain in operation during cleaning. The material removed from the basin is strained and the waste water is disposed of through conventional sewerage.

12 Claims, 7 Drawing Figures

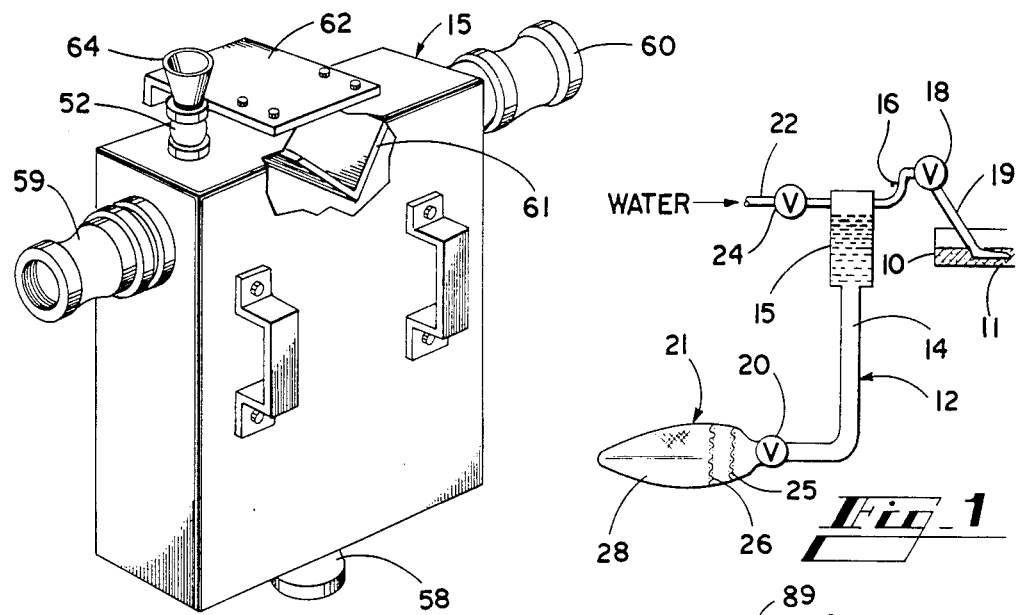
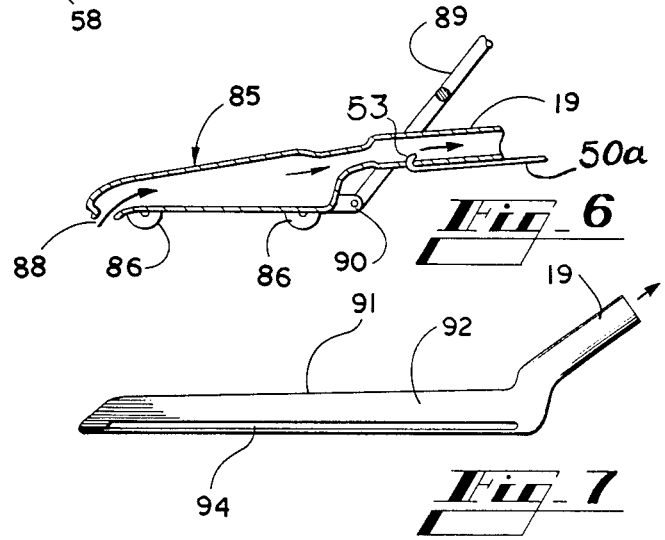
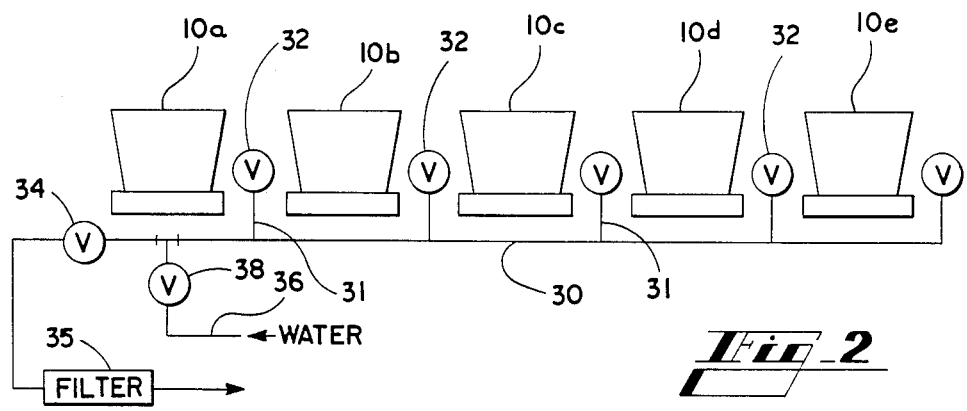

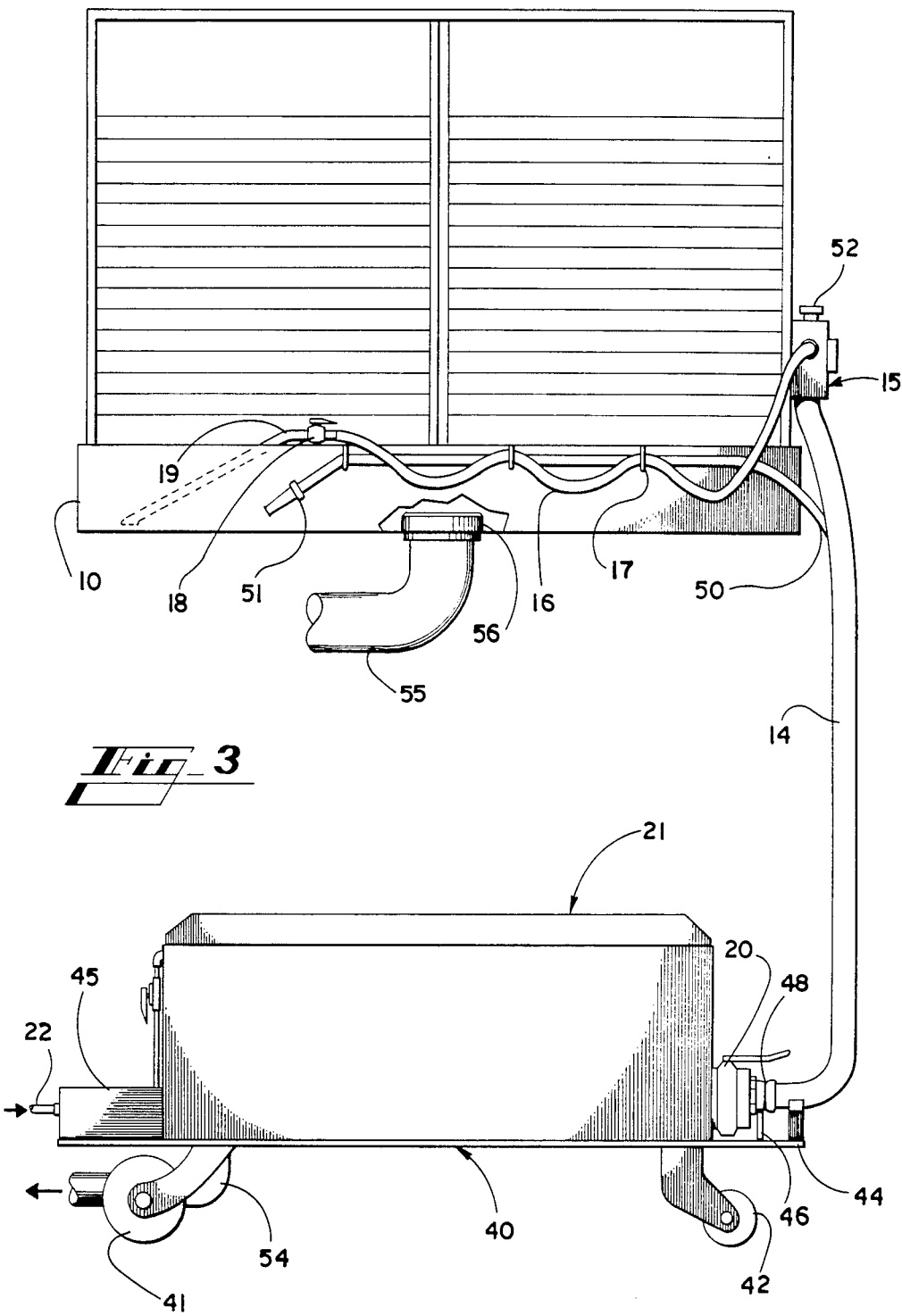
Fig_3

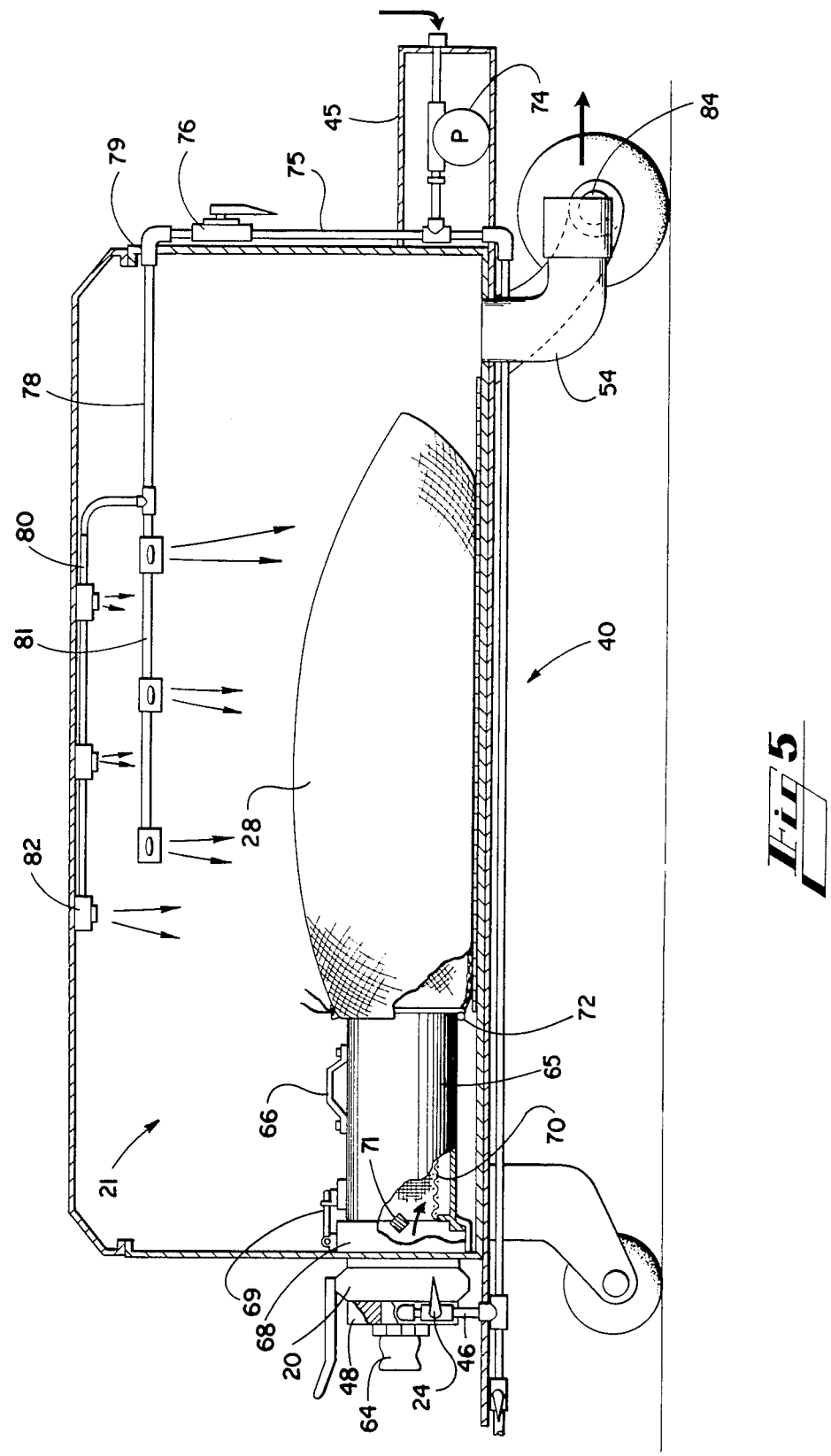

METHOD AND APPARATUS FOR CLEANING TOWER BASINS

INFORMATION DISCLOSURE STATEMENT

In refrigeration and other cooling equipment, it is common to utilize a cooling tower, wherein water is used as a heat exchange fluid to circulate through the cooling equipment, then to convey the heat to the cooling tower where heat is removed. In these cooling towers, there is conventionally a basin from which water is removed to flow to the cooling equipment, the water coming from the cooling equipment and being sprayed into the top of the cooling tower. Atmospheric air normally passes through the cooling tower, either naturally or forced by fans, to cool the water as the water passes through the tower.

It will be understood that, in the conventional cooling tower, various sediments build up in the basin. These sediments of course include contaminants that naturally occur in the cooling water, and also include contaminants picked up in the cooling system, and in the pipes connecting the cooling tower with the cooling system. Additionally, it will be understood that contaminants from the tower itself tend to collect in the water.

An additional source of contaminants that appears to be overlooked by many of the cleaning systems is the atmosphere itself. Since a cooling tower is normally situated in the open air, and generally on the top of a building, it will be recognized that sand and other airborne material will pass into the tower, and be carried into the tower basin. In an urban area, which is of course the area of greatest usage of cooling towers, the air tends to be rather highly contaminated, so there is normally a relatively rapid buildup of sediment in the towre basin. Especially when there is construction in the vicinity, it will be recognized that there will be a very large amount of dust that may include sand, clay, soot, and various petroleum products and the like that will tend to bind these contaminants together.

The result of the above discussed contaminants is that the basin of a cooling tower will accumulate a large quantity of sludge in a relatively short time.

There have been some efforts at providing a cleaning system for cooling tower basins, but these have included such systems as shown in U.S. Pat. No. 4,362,628 to Kennedy et al. wherein a conventional pump is used to remove material from a tower basin, water being filtered and returned to the tower basin. Obviously, such a system could not handle the heavy and abrasive sludge that is actually found in a tower basin. U.S. Pat. Nos. 4,389,351 and 4,427,553 disclose perforated headers disposed within the tower basin, the object being simply to pump the material from the tower basin, with periodic backflush flow. Makeup water is added which both renews the water level and dilutes the remaining tower water. Again, these systems could not handle the sludge actually found in tower basins.

One of the conventional means for maintaining a cooling tower is referred to as a "bleed". This comprises means for sensing highly contaminated water, and means for draining a portion of the basin water. The conventional makeup water valve will then replace the drained water. It will therefore be understood that the highly contaminated water is diluted with fresh water, thereby reducing the total concentration of contaminants. Clearly, this system will not remove the sludge from the bottom of the tower.

The prior art means for truly cleaning the tower basin has involved shutting down the tower, draining the basin, and the arduous task of manually shovelling the material from the tower basin. Such a procedure has numerous disadvantages, including the fact that the entire cooling system must be shut down. Also, it will be understood that the tower basin is normally coated with an anti-corrosive material, and the scraping of shovels on the basin tends to scratch or remove the anti-corrosive coating. Also, in many instances it is virtually impossible to shut down the cooling system since it may be used for such critical things as medical facilities, computer facilities and the like.

SUMMARY OF THE INVENTION

This invention relates generally to a method and apparatus for cleaning a tower basin, and is more particularly concerned with a method for removing the sludge from beneath the basin water without shutting down the tower, and with apparatus for accomplishing this method.

The present invention provides a method for removing the sludge from the bottom of a tower basin wherein water flow is established, and suction is applied to the bottom of the basin to remove the sludge therefrom. The material removed is strained to allow the water to be passed into the conventional sewer system, while damaging sludge is retained in a filter means.

In one embodiment of the invention, a siphon action is established, and the siphon action is passed through a cleaning tool having a cleaning head disposed below the basin water level. Sludge from the basin is passed through the cleaning tool, into the siphon, and the sludge is collected in a filter means while water passes therethrough to be disposed of in conventional manner. It is contemplated that the present invention may be embodied in a single, portable tool for use with various cooling towers, or may be embodied in a permanent installation for cleaning a single tower, or gang of towers.

BRIEF DESCRIPTION OF THE DRAWINGS

These and other features and advantages of the present invention will become apparent from consideration of the following specification when taken in conjunction with the accompanying drawings in which:

FIG. 1 is a schematic illustration showing the present invention as a tool for use with any selected tower basin;

FIG. 2 is a schematic illustration showing the present invention as a permanent installation for use with a gang of towers;

FIG. 3 is an elevational view showing an embodiment of the invention arranged for use in the manner of the schematic illustration of FIG. 1;

FIG. 4 is a perspective view, partially broken away, showing a reservoir for use in the system shown in FIG. 3;

FIG. 5 is an enlarged, longitudinal cross-sectional view showing the construction of a filter means of the device illustrated in FIG. 3;

FIG. 6 is a cross-sectional view showing one embodiment of a nozzle for use with the system of the present invention; and, FIG. 7 is a front elevational view of a special purpose nozzle for use with the system of the present invention.

DETAILED DESCRIPTION OF THE EMBODIMENTS

Referring now more particularly to the drawings, and to those embodiments of the invention here presented by way of illustration, FIG. 1 illustrates a tower basin 10 having a layer of sludge indicated at 11 at the bottom of the basin 10. The tool of the present invention is generally indicated at 12 and includes a vertical pipe 14 having a reservoir 15 at the uppermost end thereof. From the reservoir 15, there is a flexible hose 16 connected through a valve 18 to the cleaning tool 19.

At the lower end of the vertical pipe 14, the pipe 14 bends, passes through a valve 20 and into filter means generally designated at 21.

At the upper end of the reservoir 15, it will be seen that there is a pipe 22 having a valve 24 therein. The pipe 22 will be connected to conventional municipal water supply, or other source of generally fresh water.

In using the tool 12, it will be understood that the vertical pipe 14 will be supported, and the filter means 21 will be attached to the lower end, following the valve 20. The valve 20 will be closed, and the valve 24 will be open so water can fill the pipe 14 and the reservoir 15. Obviously, either the valve 18 can be opened to allow air to escape from the pipe 14, or other valve means can be provided to allow the escape of air as the pipe fills with water.

Once the pipe 14 and the reservoir 15 are filled with water, the valve 24 will be closed, the cleaning tool 19 will be placed below the surface of the water in the basin 10, then the valve 20 will be opened. When the valve 20 is opened, it will be understood that the water in the reservoir 15 and pipe 14 will tend to flow down by gravity, creating sufficient suction in the flexible hose 16 and the cleaning tool 19 to pull water from the basin 10 and fill the pipe. Thus, a siphon is established, and the this siphon will remain so long as the cleaning tool 19 remains below the surface of the water in the basin 10.

Obviously, the filtering means 21 could be dispensed with and the sludge 11 could be released following the pipe 14; however, one generally wishes to flush the waste water into the conventional sewerage system of the building where the cooling tower is located. Since the sludge 11 may contain golf balls, rocks, relatively large pieces of metal and the like, in addition to wood splinters, iron rust, sand, clay and other material, the conventional sewerage system may not be able to handle the sludge removed. Thus, the filtering means 21 is provided to retain the debris that the sewerage system could not handle. It is contemplated that the filtering means 21 will be rather coarse, perhaps in the nature of a strainer, the remaining waste water still containing a large number of contaminants, but of a finer size to pass through the sewerage system.

It will be noticed in FIG. 1 that the pipe 14 is considerably larger in diameter than the cleaning tool 19 and the flexible hose 16. Since these pipes are in series, the same quantity of material will pass through both the hose 16 and the pipe 14; therefore, it is clear that the velocity in the hose 16 will be greater than the velocity in the pipe 14. The pipe 14 is designed to be large enough to provide adequate suction for the system, and to pass the largest debris that may be collected from the basin 10. The cleaning tool 19 and flexible hose 16, being smaller, will ahve a sufficiently high velocity of fluid flow that the sludge will be broken up as far as possible to prevent excessive clogging of the system.

As shown schematically in FIG. 1, the filtering means 21 may include one or more wire mesh strainers, here indicated at 25 and 26. The final filtering means then comprises a woven bag 28, such as a burlap bag or the like. As will be discussed in more detail hereinafter, the strainers 25 and 26 may be permanent, and the bag 28 may be inexpensive enough to be disposable.

Looking now at FIG. 2 of the drawings, it will be understood by those skilled in the art that cooling towers are frequently installed in large groups, the plurality of individual towers and basins being connected into a single pipe for servicing large cooling equipment. For such an installation, the present invention may be permanently installed as is indicated in FIG. 2. In FIG. 2, the tower basins are indicated at 10a, 10b, 10c, 10d and 10e. A single pipe designated at 30 has a plurality of vertically extending branches 31, one of the branches 31 being adjacent to each of the basins 10a-10e, and each branch 31 has a valve 32 at its uppermost end.

The lowermost end of the pipe 30 includes a valve 34 which feeds into a filtering means 35. A source of water is indicated at 36, passing through a valve 38.

In view of the foregoing discussion, it should be understood that the pipe 30 and the branches 31 comprise the equivalent of the vertical pipe 14 and the reservoir 15, through an additional reservoir can be added similar to the reservoir 15 if desired. A flexible hose and cleaning tool can be attached at the valve 32 adjacent to the tower basin to be cleaned. To utilize the system, the valve 34 will be closed and the valve 38 opened to fill the pipe 30 and branches 31 with water. When the valve 38 is turned off, and the valve 34 is opened, water will flow from the appropriate branch 31, through the pipe 30, and through the filtering means 35. A siphoning action will therefore be established and the cleaning tool will be used to clean a tower basin as previously discussed.

Attention is next directed to FIG. 3 of the drawings which shows an embodiment of the invention set up for cleaning a single tower basin. The device in FIG. 3 is an embodiment of the invention made in accordance with schematic representation shown in FIG. 1. The device includes a portable tool that can be used for cleaning any given tower basin. In general, the device in FIG. 3 includes the reservoir 15, the vertical pipe 14, the valve 20 and filtering means indicated at 21. The flexible hose 16 is connected through a valve 18 to the cleaning tool or wand 19. The tower basin is indicated at 10. With this general orientation, the details of the arrangement should be understood.

The embodiment of the invention shown in FIG. 3 includes a wheeled truck or the like generally designated at 40, and including a first set of wheels 41 and a set of casters 42. The right hand end as shown in the drawings is indicated at 44 and can be used as a handle so the truck 40 can be manipulated as a conventional hand truck carrying the apparatus thereon.

The fresh water line is designated at 22, and leads to a pump housing 45. It will be understood that fresh water supply at the top of a building may be under very low pressure because of the height. The housing 45 therefore contains a pump to increase the water pressure. The water is then directed through a line shown somewhat at 46, and directed into a coupling 48. It will be seen that the coupling 48 is beyond the valve 20 so water is directed into the coupling 48, and will be allowed to flow into the pipe 14 and the reservoir 15.

An additional water line 50 may be carried by the pipe 14, the line 50 terminating in a nozzle 51. It is contemplated that the water line 50 will be connected to receive the output of the pump in the housing 45 to provide a convenient wash-down means. While the basin 10 is being cleaned by the tool 19, the nozzle 51 may direct water against the louvers etc. of the tower. Loose material will be caused to fall into the basin where it can be picked up by the cleaning tool 19 and conveyed into the pipe 14.

Considering use of the arrangement as shown in FIG. 3, it will be understood that all of the flexible pipe 14 and the flexible hose 16 can be carried by the housing for the filter, so the entire apparatus can be transported by the truck 40 in conventional handtruck fashion. When the apparatus is adjacent to the tower basin 10 to be cleaned, the truck will be placed as shown, and the line 22 will be connected to the fresh water supply line. The reservoir 15 will be placed as appropriate, perhaps hung from one of the louvers on the tower, and the pipe 14 connected between the reservoir 15 and the valve 20. A plurality of simple hooks 17 can be used to hang the flexible hose 16 from the tower basin 10. As will be discussed in more detail hereinafter, there may be a check valve 52 on the reservoir 15 for convenience.

The valve 20 will now be closed, and fresh water will be entered through the line 46 to fill the pipe 14 and the reservoir 15. The valve 18 will be closed so water will not flow into the basin; nevertheless, water will somewhat fill the hose 16 since the reservoir 15 is disposed above the hose 16. It is contemplated that the check valve 52 will allow the escape of air; therefore, one can watch the check valve 52, and when water rather than air flows through the valve, one knows the system is filled.

At this point, the check valve 52 will prevent the backflow of air into the reservoir 15, so that tool 19 will be placed under the surface of the water in the basin 10, the valve 18 will be opened, and the valve 20 will be opened. Water will therefore flow by gravity from the reservoir 15 and from the vertical pipe 14 through the valve 20 and through the filtering means 21. A discharge pipe 54 leads from the housing to discharge as appropriate. Of course, a continuous hose can be carried from the discharge pipe 54 to a sewer system, or the truck 40 can be placed adjacent to the drain and the waste water can be discharged openly from the discharge line 54.

It will noticed that the pipe 55 extends from the tower basin 10, the pipe 55 being the connection to the cooling equipment. A cap 56 is shown in place over the drain within the tower basin 10. It is contemplated that this cap 56 will include a strainer, and will restrict water flow into the pipe 55, but will not stop such water flow. While such an arrangement can be used in only certain circumstances, it will be understood that, at times, there will be two or more basins serving the same cooling equipment, and the cooling equipment may not be operating at full capacity. In this instance, it will be understood that the full capacity of all cooling towers is not required, and water flow can be restricted. When water flow can be so restricted, it is desirable to utilize a cap such as the cap 56 to reduce the possibility that some agitation of the water within the tower basin 10 will cause some debris to flow into the pipe 55, and into the cooling equipment.

Attention is next directed to FIG. 4 of the drawings which shows the reservoir 15 in more detail. It will be seen that the reservoir 15 is a generally rectangular housing having a large hose connection 58 to receive the pipe 14, the connection 58 being at the bottom of the reservoir 15. At the top of the reservoir, and extending from each side thereof, there are smaller hose connections 59 and 60.

Between the hose connections 59 and 60 there is an angled diverter designated at 61. Those skilled in the art will understand that material passing through the hose connection 59 will engage one side of the diverter 61 and be directed downwardly. Without the diverter 61, material may pass from one hose connection to the other, and the additional turbulence induced may reduce the efficiency of the system.

While the reservoir 15 may include only one hose connection such as the connections 59 and 60, it is contemplated that a single reservoir 15 may be placed on one tower, and two hoses such as the hose 16 can be connected thereto to allow two cleaning tools to be used simultaneously. In some cases, a single reservoir 15 may be placed appropriately so that two different tower basins can be cleaned at the same time. The hook 62 is provided to allow the reservoir 15 to be hung from a louver or other appropriate location on a tower.

It will also be seen that the top surface of the reservoir 15 has the check valve 52 extending therefrom. Above the valve 52, there is a transparent cone-shaped member 64. As was previously discussed, the check valve 52 will allow air to flow outwardly from the reservoir 15, but will prevent air from flowing into the reservoir 15. As the system is filled with water as was discussed in conjunction with FIG. 3 of the drawings, water will eventually flow through the check valve 52 and will fill the cone-shaped member 64. One can therefore view the water as it rises in the member 64. When the member 64 is reasonably filled with water, the filling valve (e.g. valve 24) will be turned off.

By retaining the water in the member 64, it will be understood that a constant test is provided to be sure the valve 52 is not leaking. Obviously, if the valve 52 leaks, the water in the member 64 will be sucked into the reservoir 15. Therefore, so long as the member 64 has water therein, the valve 52 is operating properly.

Further with respect to the reservoir as shown in FIG. 4 of the drawings, it will be understood that such a reservoir will not always be required for a system made in accordance with the present invention. However, those skilled in the art will understand that the larger volume of water held by the reservoir 15 is desirable to assure the starting of the siphon action, even though not all of the air may be removed from the system. Additionally, with the arrangement shown in FIG. 3, it will be seen that the water and other generally liquid material will flow through the hose connections 59 and 60 and fall to the bottom of the reservoir 15 to pass through the hose connection 58 and through the pipe 14. So long as the bottom of the reservoir contains liquid, the operation of the siphon will continue. Thus, the reservoir 15 can accumulate some air at the top without terminating the siphon action. This is highly desirable since it would be a simple matter for someone to remove the cleaning tool 19 inadvertently from the water in the tower basin and allow some air to enter the system. While the only penalty is that one must begin operation again as previously discussed, it is much more efficient to allow the system to absorb some air without the necessity for restarting the siphon.

Attention is next directed to FIG. 5 of the drawings for a more detailed discussion of the truck 40 and the apparatus carried thereby. It will be seen that the pipe 14 is omitted, and the connector 64 is indicated for connection of the pipe 14. The connector 64 extends from the coupling 48 is adjacent to the valve 20. It will be seen that the water supply tube 46 includes a valve 24 for controlling the flow of water into the coupling 48, hence into the pipe 14.

The filter means generally designated at 21 includes a strainer housing 65 having a handle 66 for convenient manipulation thereof. The strainer housing 65 is in the nature of a rectangular housing removably received by the fitting 68, clamp means 69 being provided for conveniently fixing the strainer housing 65 to the fitting 68.

As shown in the broken-away section, there is a strainer basket 70 within the strainer housing 65, and there is a handle 71 extending transversely of the strainer basket 70. The handle 71 both provides convenient means for manipulating the basket 70, and provides a diverting means to cause the fluid passing into the basket to be diverted to the top and bottom of the strainer basker 70. The object of this is to distribute the accumulated debris over the entire strainer basket rather than have all of the fluid to pass directly to the bottom, or right hand end, of the basket 70.

The righthand end of the strainer housing 65 includes an outwardly turned flange 72 which receives a drawstring or the like to hold a filter bag 28 thereon. As previously discussed, the bag 28 may be burlap or the like, having a mesh of the desired coarseness to remove a large quantity of the particulate material.

As is well known in the art, a filter material tends to become blinded to prevent further flow therethrough. It is known in the art to backwash a filter to remove the embedded material and allow further use of the filter. In an arrangement such as that shown herein, it will be understood that a backwashing arrangement would be extremely expensive and cumbersome because of the rather large volume of material. Also, since a siphon is being used as the moving force for the liquid, a backwashing arrangement might well break the siphon. It has been found, however, that a continuous washing of the filter bag 28 with fresh water provides an admirable means for allowing continued use of the filter bag 28.

As was previously discussed, there is a pump housing 45 at one end of the truck 40, the housing 45 containing a pump 74. The output of the pump 74 is connected to a line 75 containing a valve 76. From the valve 76, a line 78 enters the filter enclosure 79, and the line 78 branches into two lines 80 and 81. The two lines 80 and 81 contain a plurality of nozzles designated at 82. Preferably, the nozzles 82 will be of a pulsating type, though virtually any form of nozzle can be utilized.

It will be now be understood that, with material flowing through the system as previously discussed, and out through the filter bag 28, there will be a tendency for solid material to flow into the mesh of the bag 28 from the inside and blind the filter bag. With water under pressure provided by the pump 74, and through the nozzles 82, the water from the nozzles 82 will effectively backwash the upper surface of the bag 28 to provide for continued flow through the bag 28.

As material flows from the bag 28, the liquid will flow through the discharge pipe 54 and into an appropriate sewerage system or the like. As is best shown in FIG. 5 of the drawings, the discharge pipe 54 is placed above the axle 84 for the wheels 41. This placement allows free use of the truck 40 without danger of damaging the discharge pipe 54.

Looking briefly at FIG. 6 of the drawings, FIG. 6 shows a nozzle 85 to be carried by the cleaning tool 19. The nozzle 85 has wheels 86 to roll along the bottom of the tower basin and prevent scratching of the basin, and possible removal of the anti-corrosive coating. An entry slot 88 allows sludge and other material to enter the nozzle 85 and pass through the cleaning tool 19, then into the flexible hose 16. A handle 89 may be pivoted to the nozzle as at 90 for convenient manipulation of the nozzle 85.

In the event the suction through use of the siphon is not sufficient in some cases, perhaps if the sludge is especially heavy or the like, the high pressure water line 50 may be used to increase the suction. FIG. 6 indicates the line 50a running down the cleaning tool 19, the line 50a terminating in a return bend to provide an injector nozzle 53. It will be understood that the line 50a will be connected to the line 50 to receive water under pressure therefrom. With this arrangement, the high pressure from the pump can increase the suction in the system.

While the nozzle shown in FIG. 6 would be conveniently useable in the broad area of the basin 10, it will be understood that many towers have arrangements wherein louvers extend into the basin so that areas are very difficult to reach for cleaning. In that event, a nozzle such as that shown in FIG. 7 and designated at 91 may be used. The nozzle 91 is in the nature of a crevice tool having an elongated body 92 with a slot 94. The nozzle 91 can be manipulated from the cleaning tool 19 to reach otherwise difficult places in the tower basin 10.

It will now be understood that the present invention provides an extremely simple and highly effective tool for cleaning the basin of a cooling tower or the like. Since the apparatus uses a siphon, it will be understood that a ceratin minimum head will be required; however, it has been found that a head of four feet or so is adequate even for very heavy sludge, and this distance is generally obtainable in cooling tower installations. Also, since the siphon provides a uniform suction, the sludge in the tower basin is moved consistently into the cleaning nozzle for almost no disturbance of the tower water. As a result, the tower can be operated normally, and the settled sludge will be removed without agitation that may cause material to enter the cooling system. Since the tower does not have to be shut down, it will be understood that one may take the time necessary to do a thorough cleaning job and remove all the sludge and other contaminants from the tower basin. The high pressure hose 50 can be used to wash down the louvers and remove various growths as well as loose scale and the like, and this material can also be picked up by the cleaning system. Since the waste is filtered, or strained, the waste water can conveniently be disposed of in a conventional sewerage system without danger of stopping up the sewerage system. Also, since the filter bag is used, it has been noted that the bag, when wet, can collapse and act somewhat as a flap valve to prevent air from entering the bottom of the system even though flow is temporarily terminated.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or the scope of the invention as defined in the appended claims.

We claim:

1. A cooling tower basin cleaning apparatus for cleaning debris-containing sludge from below the water in a tower basin comprising a cleaning tool having a nozzle thereon, a hose connected to said cleaning tool for receiving said sludge from said cleaning tool, and siphon means for creating continuous suction on said cleaning tool and for carrying said sludge from said tower basin, said siphon means including a reservoir disposed above the level of said water in said basin, and pipe means extending from said reservoir to a lower level below the level of said water in said basin, said hose being connected to and in communication with said reservoir, a first valve for selectively closing said pipe means at said lower level, water supply means for filling said pipe means and said reservoir with water while said first valve is closed, the arrangement being such that said pipe means can be filled with water with said first valve closed, and said first valve can be opened to establish a siphon action to provide suction on said cleaning tool.

2. Apparatus as claimed in claim 1, said pipe means having a larger diameter than said hose for causing higher velocity liquid flow in said hose than in said pipe means and said reservoir.

3. Apparatus as claimed in claim 2, and further including filter means at said lower level for receiving and filtering liquid passing through said pipe means.

4. Apparatus as claimed in claim 3, said filter means including a strainer adapted to receive said liquid from said pipe means, and a filter bag connected to and adapted to receive said liquid from said strainer, said first valve means being located between said strainer and said pipe means.

5. Apparatus as claimed in claim 4, and including a coupling between said first valve and said pipe means, said coupling defining an opening therein for receiving water from said water supply, and second valve means for controlling water from said water supply.

6. Apparatus as claimed in claim 5, said filter means further including a plurality of nozzles adjacent to said filter bag, said plurality of nozzles being connected to said water supply, the arrangement being such that water from said plurality of nozzles backwashes said filter bag for allowing continued use of said filter bag, and a pump for increasing water pressure from said water supply, said pump being located between said water supply and said plurality of nozzles.

7. Apparatus as claimed in claim 2, and further including an injector nozzle mounted in said cleaning tool and connected to said water supply for directing water under pressure into said cleaning tool for assisting said suction.

8. Apparatus as claimed in claim 1, said reservoir comprising a housing, a first hose connection at the bottom of said housing for receiving said pipe means, a second hose connection at the top of said housing for receiving said hose connected to said cleaning tool, and mounting means for supporting said reservoir from said tower.

9. Apparatus as claimed in claim 8, said reservoir further including a check valve on an upper wall thereof for allowing fluid to flow from said reservoir and preventing fluid from flowing into said reservoir.

10. A method for cleaning the basin of a cooling tower having debris-containing sludge on the bottom of said basin, while cooling water is flowing into and out of said basin, said method including the steps of: placing a cleaning tool in said tower basin with the end of said cleaning tool beneath the level of the water in said basin; establishing a siphon to provide continuous suction on said cleaning tool, wherein said step of establishing a siphon includes the steps of filling with water to a point above the level of said water in said basin a reservoir disposed above the level of said water in said basin and a pipe means extending from said reservoir to a lower level below the level of said water in said basin, connecting said cleaning tool to a hose connected to said reservoir at a high level above said level of water in said basin, and allowing the water to flow by gravity from said pipe means from a low level below said basin; moving said cleaning tool about said basin for utilizing said siphon to pick up and to remove said sludge from said tower basin by sucking in said sludge and some water from said basin without causing a substantial disturbance of said water; and continually replenishing the water in the basin.

11. A method as claimed in claim 10, and further including the step of filtering the sludge and the water removed from said basin to remove solid material, and placing the remainder in a sewerage system.

12. A method as claimed in claim 11, and further including the steps of closing off said tool for preventing air from entering said tool and closing off said second end of said pipe for preventing air from entering said pipe, while maintaining liquid in said pipe for allowing restarting of the siphon.

* * * * *